(12) United States Patent
Eberlein

(10) Patent No.: US 10,479,387 B2
(45) Date of Patent: Nov. 19, 2019

(54) TRANSPORTING DEVICE THAT CAN BE MOVED BY HAND

(71) Applicant: Martin Eberlein, Kammeltal (DE)

(72) Inventor: Martin Eberlein, Kammeltal (DE)

( * ) Notice: Subject to any disclaimer, the term of this patent is extended or adjusted under 35 U.S.C. 154(b) by 0 days.

(21) Appl. No.: 16/083,025

(22) PCT Filed: Mar. 2, 2017

(86) PCT No.: PCT/DE2017/000055
§ 371 (c)(1),
(2) Date: Sep. 7, 2018

(87) PCT Pub. No.: WO2017/152893
PCT Pub. Date: Sep. 14, 2017

(65) Prior Publication Data
US 2019/0084603 A1  Mar. 21, 2019

(30) Foreign Application Priority Data
Mar. 10, 2016 (DE) .................... 20 2016 001 594 U

(51) Int. Cl.
*B62B 3/14* (2006.01)
*B62B 5/06* (2006.01)

(52) U.S. Cl.
CPC .......... *B62B 3/1468* (2013.01); *B62B 3/1444* (2013.01); *B62B 5/06* (2013.01)

(58) Field of Classification Search
CPC ..... B62B 3/1468; B62B 3/144; B62B 3/1444; B62B 3/1456; B62B 3/18; B62B 5/06
See application file for complete search history.

(56) References Cited

U.S. PATENT DOCUMENTS 2,479,530 A * 8/1949 Watson .................... B62B 3/14
206/519
2,590,285 A * 3/1952 Wiltshire .................. B62B 3/14
280/3

(Continued)

FOREIGN PATENT DOCUMENTS

DE       29714128 U1   10/1997
DE    102009042287 A1   3/2011

(Continued)

OTHER PUBLICATIONS

International Search Report for PCT/DE2017000055, ISA/EP, Rijswijk, NL, dated Jun. 14, 2017 with English translation.

(Continued)

*Primary Examiner* — Jacob B Meyer
(74) *Attorney, Agent, or Firm* — Harness, Dickey & Pierce, P.L.C.

(57) ABSTRACT

A transporting device includes a first carrying device and a second carrying device arranged above the first carrying device. The first carrying device is wider than the second carrying device. The first carrying device has first fixing members each arranged in the rear area of the carrying device and on both sides. A handle device for moving the carrying device is fixed to each first fixing members. The second carrying device has second fixing members each arranged in the rear area of the carrying device and on both sides. Each handle device is additionally fixed to the nearest of the two second fixing members. Between the two handle devices an interspace is formed, which is used by the second carrying device of a rear transporting device when the latter is pushed into a transporting device located in front.

11 Claims, 1 Drawing Sheet

(56) References Cited

U.S. PATENT DOCUMENTS

Figure 1:
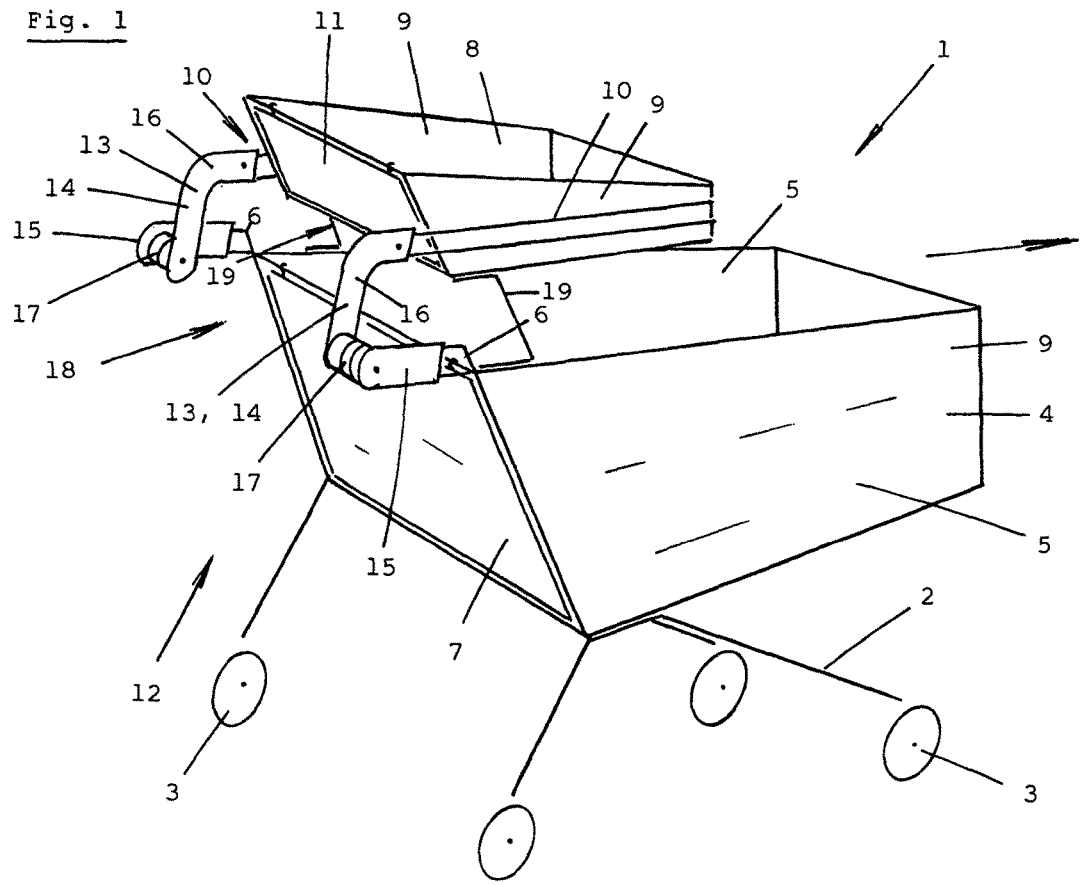

| | | | | |
|---|---|---|---|---|
| 3,534,973 | A * | 10/1970 | Elliott | B62B 3/1468 280/33.992 |
| 5,435,582 | A * | 7/1995 | Davidson | B62B 3/1464 280/33.992 |
| 5,507,507 | A * | 4/1996 | Davidson | B62B 3/1464 280/33.991 |
| 6,644,674 | B2 * | 11/2003 | Simard | B62B 3/1468 280/33.991 |
| 9,174,659 | B2 * | 11/2015 | Stauff | B62B 3/1404 |
| 9,227,646 | B2 * | 1/2016 | Stauff | B62B 3/1476 |
| 9,598,097 | B2 * | 3/2017 | Sherman | B62B 3/144 |
| 9,682,719 | B2 * | 6/2017 | Stauff | B62B 3/1476 |
| 9,731,742 | B2 * | 8/2017 | Stauff | B62B 3/1404 |
| 9,944,304 | B2 * | 4/2018 | Sherman | B62B 3/144 |
| 2003/0151219 | A1 * | 8/2003 | Simard | B62B 3/1468 280/47.35 |
| 2004/0111320 | A1 * | 6/2004 | Schlieffers | A47F 9/047 705/16 |
| 2005/0146103 | A1 * | 7/2005 | Lampe | B62B 3/1436 280/47.34 |
| 2010/0276899 | A1 * | 11/2010 | Burdwood | B62B 3/1404 280/33.991 |
| 2013/0069326 | A1 * | 3/2013 | Padgett | B62B 3/1476 280/47.35 |
| 2016/0075361 | A1 * | 3/2016 | Stauff | B62B 3/1476 280/33.996 |
| 2016/0096542 | A1 * | 4/2016 | Fukushima | B62B 3/1468 224/411 |
| 2016/0339937 | A1 * | 11/2016 | Dyer | B62B 3/1468 |
| 2016/0339938 | A1 * | 11/2016 | Hunt | B62B 3/1468 |
| 2017/0190347 | A1 * | 7/2017 | Sherman | B62B 3/144 |
| 2018/0229747 | A1 * | 8/2018 | Sherman | B62B 3/144 |
| 2019/0084603 | A1 * | 3/2019 | Eberlein | B62B 5/06 |

FOREIGN PATENT DOCUMENTS

| | | |
|---|---|---|
| GB | 2312653 A | 11/1997 |
| WO | WO-2011/161390 A1 | 12/2011 |

OTHER PUBLICATIONS

Written Opinion of the ISA for PCT/DE2017000055, ISA/EP, Rijswijk, NL, dated Jun. 14, 2017.

* cited by examiner

TRANSPORTING DEVICE THAT CAN BE MOVED BY HAND

CROSS-REFERENCE TO RELATED APPLICATIONS

This application is a 371 U.S. National Stage of International Application No. PCT/DE2017/000055, filed Mar. 2, 2017, which claims priority to German Patent Application No. 20 2016 001 594.0, filed Mar. 10, 2016. The entire disclosures of the above applications are incorporated herein by reference.

The invention relates to a transporting device that can be moved by hand and stacked in stacks of identical devices, comprising a first carrying device and comprising a second carrying device arranged above the first carrying device, wherein the first carrying device, viewed from above, is designed to be wider than the second carrying device, wherein moreover the first carrying device has a first fixing means each arranged in the rear area of the carrying device and on both sides, and wherein a handle device for moving the transporting device is fixed to each first fixing means.

Transporting devices with a first and with a second carrying device are known by various sample embodiments, see for example the document DE 297 14 128 U1. In these transporting devices, a handle device in the form of a transversely situated push handle is common, wherein this handle device can be arranged either on the spars of the chassis or on the second, i.e., higher situated carrying device. A transporting device with three carrying devices is also described, for example, in DE 10 2009 042 287 A1.

The closest prior art also includes a transporting device that can be moved by hand and stacked in stacks of identical devices in the form of a shopping cart for self-service markets. The firm Wanzl GmbH in Germany sells such a transporting device under the brand "Scandy", in which a first carrying device in the form of a conical basket outfitted with a rear flap is arranged on a chassis and a second carrying device is provided above the first carrying device, being fastened to the first carrying device. This second carrying device is also conical in shape and its back side is likewise closed by a pivotable flap. The upper carrying device is slightly broader than the lower carrying device. The two carrying devices are each fixed to an upward slanting spar situated on the long sides of the chassis. Between the spars are arranged two horizontally disposed support struts, which additionally brace the two carrying devices at the bottom. In the rear area of the first carrying device there is provided a pushing device, which comprises two handle devices, joined by a horizontally situated and transversely extending tubular push handle. The transporting device can be moved by hand, both with the aid of the two handle devices and also alternatively solely with the aid of the push handle. Even though the first and the second carrying device are configured such that they can be pushed into identical carrying devices of another transporting device that can be moved by hand during the stacking of two transporting devices, the stacking effect so achieved is therefore unsatisfactory because the configuration of the chassis is found to be very cumbersome and takes up space which could be used for a tight stacking. The stacking distance of two nested transporting devices is therefore relatively large, so that an enormous space and footprint is required for several identical transporting devices that are provided for use by customers.

The problem which the invention proposes to solve is to modify a transporting device of the above indicated kind such that, by doing away with a transversely extending push handle, both the two handle devices and also the second carrying device are still fixed in a sufficiently stable manner so that the chassis can have an extremely simple design and identical transporting devices can be nested in each other in a more space-saving manner than heretofore.

The solution of the problem is described in the characterizing passage of claim 1.

A first benefit of the solution found is that identical transporting devices according to the invention can be stacked in an extremely space-saving manner. An overall large space and room saving is achieved when parking several transporting devices in a row. Thanks to the fastening of the two handle devices to the second carrying device, a connection is created between the lower, i.e., the first carrying device and the upper, i.e., the second carrying device. In this way, to mention a second advantage, no side spars are required, which would have to have supported both the first and the second carrying device. The two handle devices are able by themselves to support the second carrying device. Therefore, the structural height of the proposed transporting device is also further reduced in an advantageous manner, so that there is a sufficient open view when pushing such a transporting device. Thanks to eliminating a transversely running push handle, a free gap is established between the two handle devices which can be utilized by the second carrying device of the nested transporting device when nesting together two identical transporting devices so that the second carrying device of the nested transporting device can move past the handle devices of the carrying device in front and be pushed deep into the second carrying device of the transporting device in front. The same also holds for the first carrying device of the two transporting devices. Such closely stacked transporting devices can therefore also be shipped economically, since the space and room requirement, as already mentioned, is extremely slight.

The invention shall be explained more closely with the aid of a sample embodiment. There are shown:

FIG. 1, a transporting device in three-dimensional representation, and

Figure 2:
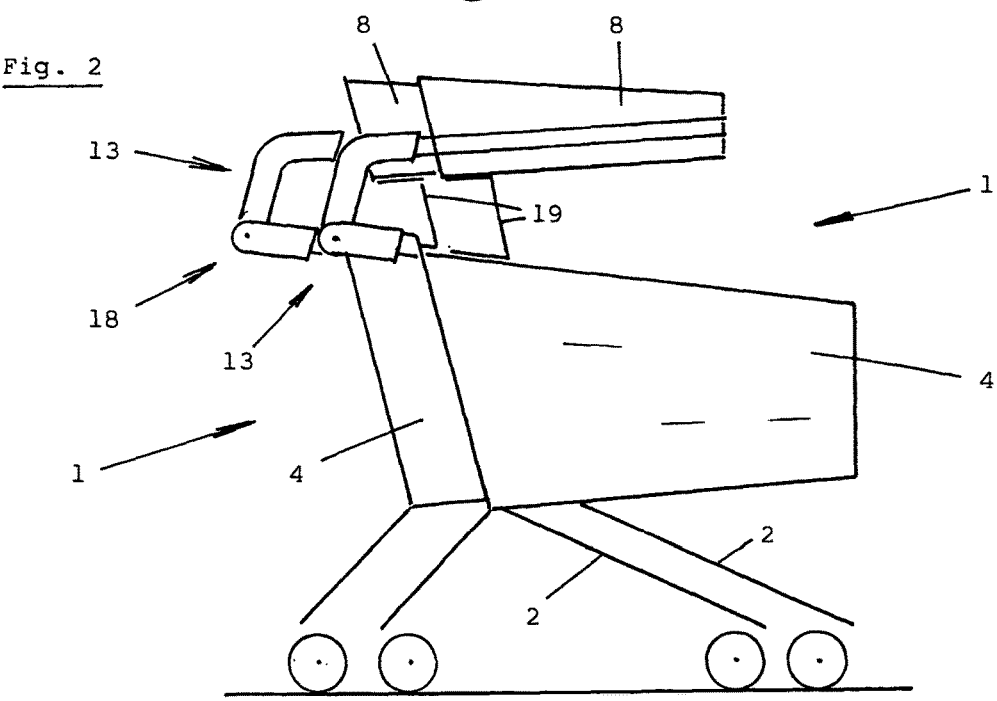

FIG. 2, two identical transporting devices in stacked condition.

The transporting device 1 represented in FIG. 1 has a chassis 2, outfitted with rollers 3, at which or on which a first carrying device 4 is secured in a known manner. Above the first carrying device 4 there is provided a second carrying device 8, which is braced below on the first carrying device 4. On either side of the first and the second carrying device 4, 8 there is provided a handle device 13, which is designed for moving the transporting device 1. The chassis 2 as well as the first and second carrying device 4, 8 are designed so that identical transporting devices 1 can be nested together for the purposes of space saving. To allow this to occur, the mentioned parts and/or subassemblies make use of known design and technical features already known for commercial shopping carts. A typical example of this is the transporting cart described in document DE 2009 042 287 A1, which has all these known features. Thus, carrying devices 4, 8 for example may be configured as a conical basket or as a loading platform. A shell configuration is also conceivable. All these carrying devices 4, 8 are ultimately intended to hold merchandise as well as commercial goods of every kind, so that they can be transported with the transporting device 1. Accordingly, the term "transporting device" subsumes every apparatus which can be moved by hand, such as shopping carts, transporting carts, luggage carriers, or also hardware store carts, which can be stacked together with identical carts in a space-saving manner. Now, it is proposed to do away with the previously customary push handle extending transversely to a pushing direction (arrow). It is apparent from the drawing that on both sides of the first and the second carrying device 4, 8 and in their common rear area 12, in each case one handle device 13 is provided, which are arranged in mirror symmetry to each other. Emerging from the two side walls 5, 9 of the first and the second carrying device 4, 8 there are provided first and second fixing means 6, 10, such as wire loops, to which the two handle devices 13 are secured, which means conversely that the second carrying device 8 is connected with the aid of the two handle devices 13 to the first carrying device 4. Thus, each handle device starting from the two first fixing means 6 is additionally braced against the closest of the two second fixing means 10. In this way, a gap 18 is formed between the two handle devices 13, which can be utilized by the second carrying device 8 of a rear transporting device 1 when it is pushed into a transporting device 1 located in front. Thus, each handle device 13 can be fashioned for example as a single molded plastic piece. It is likewise possible to fashion each handle device 13 as two or more pieces. The solution illustrated here uses two handle devices 13, which each employ a known so-called grip cap 15 and a known pistol grip 16 as interconnected components, with suitable screw fasteners to form the two handle devices 13. Known shopping carts make use of such components. The components known as grip caps 15 are fastened to the first (6) and the components known as pistol grips 16 are fastened to the second fixing means 10. Between these components, if necessary, a connection means 17 can be provided in each case in the form of a short piece of pipe. Thus, each handle device 13 has a handle section 14, see piston grip 16, which is provided for moving the transporting device 1. The first carrying device 4, viewed from above, is designed to be wider than the second carrying device 8, which is usually arranged, likewise viewed from above, on the same longitudinal axle as the first carrying device 4.

In addition, FIG. 2 shows two identical transporting devices 1 nested in each other in a space-saving manner. The chasses 2 of the first carrying devices 4 and the second carrying devices 8 are nested tightly in one another. The handle devices 13 do not hinder this position, due to the presence of the gaps 18. The back side of both the first (4) and the second carrying device 8 is formed each time, as already indicated, by a known pivotable rear wall 7, 11, see FIG. 1. The purpose and function of these rear walls 7, 11 are known.

In addition, a supporting piece 19 may be provided between the first carrying device 4 and the second carrying device 8 near the two handle devices 13, the supporting pieces 19 being designed primarily to prevent a possible swinging of the second carrying device 8 during use of the transporting device 1, also see FIG. 1. Accordingly, the supporting pieces 19 likewise form a connection between the first carrying device 4 and the second carrying device 8.

The invention claimed is:

1. A transporting device that can be moved by hand and stacked in stacks of identical devices, comprising a first carrying device and comprising a second carrying device arranged above the first carrying device, wherein the first carrying device has two side walls and a pivotable rear wall and the second carrying device has two side walls and a pivotable rear wall and wherein the first carrying device is wider than the second carrying device, wherein the first carrying device has two first fixing means emerging from its side walls, on which a respective handle device is fixed, and the second carrying device has two second fixing means, which connect the second carrying device to the first carrying device, in that between the two handle devices there is formed a gap which is used by the second carrying device of a rear transporting device when the latter is pushed into a transporting device located in front, and in that in the stacked condition of two transporting devices their first carrying devices on the one hand and their second carrying devices on the other hand are partly pushed into each other, wherein the second carrying device is connected with the aid of its second fixing means to the two handle devices,
wherein the handle devices are positioned between the side walls of the first carrying device.

2. The transporting device as claimed in claim 1, wherein each handle device is of single-part or multiple-part design.

3. The transporting device as claimed in claim 1, wherein each handle device is formed by a familiar grip cap and by a familiar pistol grip, wherein a connection means is optionally provided between the grip cap and the pistol grip.

4. The transporting device as claimed in claim 1, wherein the first fixing means project to the rear beyond the first carrying device and the second fixing means project to the rear beyond the second carrying device.

5. The transporting device as claimed in claim 1, wherein the handle devices are arranged in mirror image.

6. The transporting device as claimed in claim 1, wherein an additional connection is formed between the second carrying device and the first carrying device by two support pieces.

7. The transporting device as claimed in claim 2, wherein each handle device is formed by a familiar grip cap and by a familiar pistol grip, wherein a connection means is optionally provided between the grip cap and the pistol grip.

8. The transporting device as claimed in claim 3, wherein the grip caps are secured to the first fixing means and the pistol grips are secured to the second fixing means.

9. The transporting device as claimed in claim 1, wherein the handle devices are positioned substantially above the first carrying device.

10. The transporting device as claimed in claim 1, wherein the second fixing means are positioned between the side walls of the first carrying device.

11. The transporting device as claimed in claim 1, wherein the handle devices support the second carrying device.

* * * * *